Dec. 12, 1950        D. W. ERSKINE        2,533,568
CLUTCH BEARING LUBRICATION
Filed Nov. 26, 1947        2 Sheets-Sheet 1
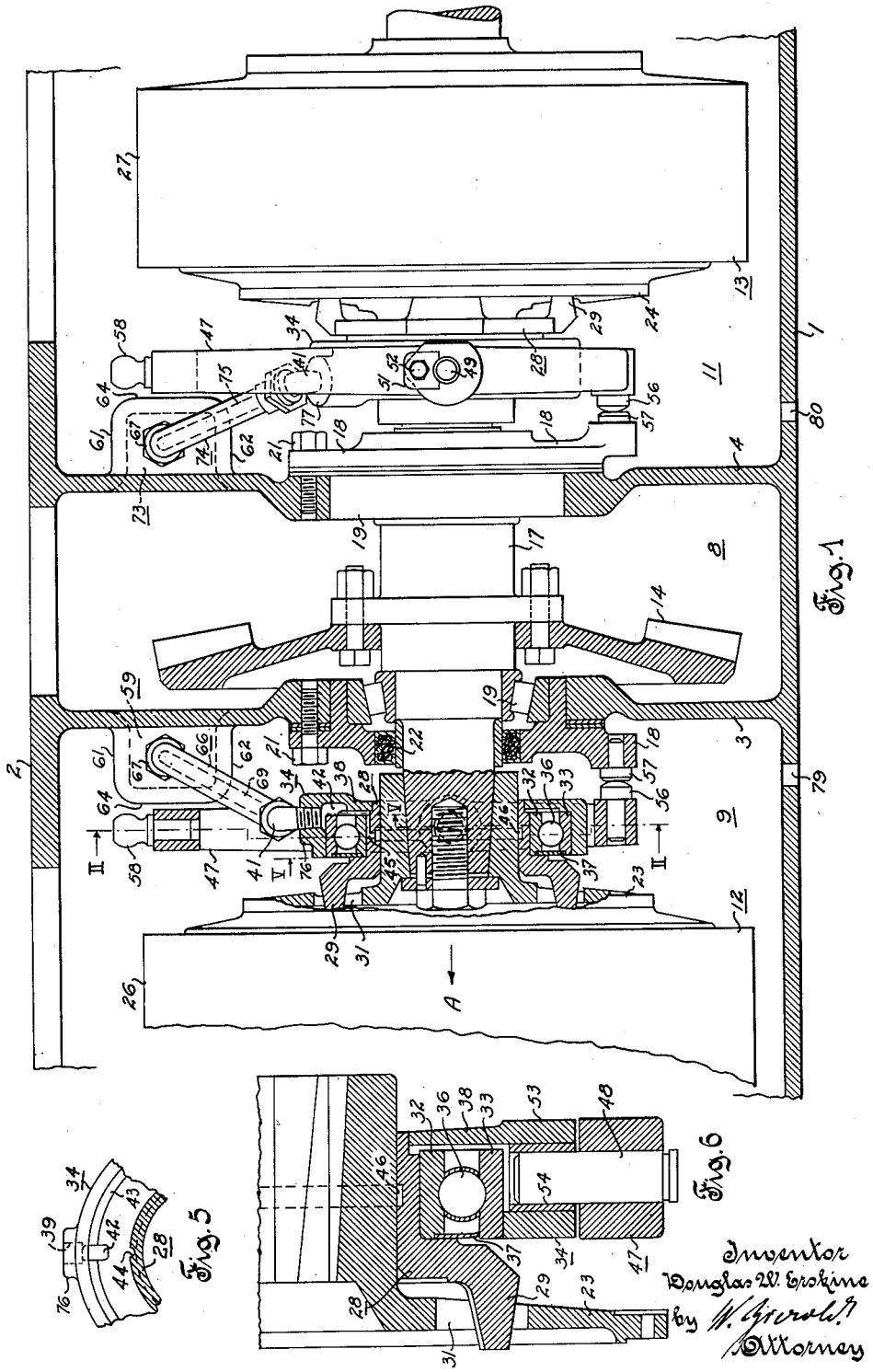
Inventor
Douglas W. Erskine
by
Attorney

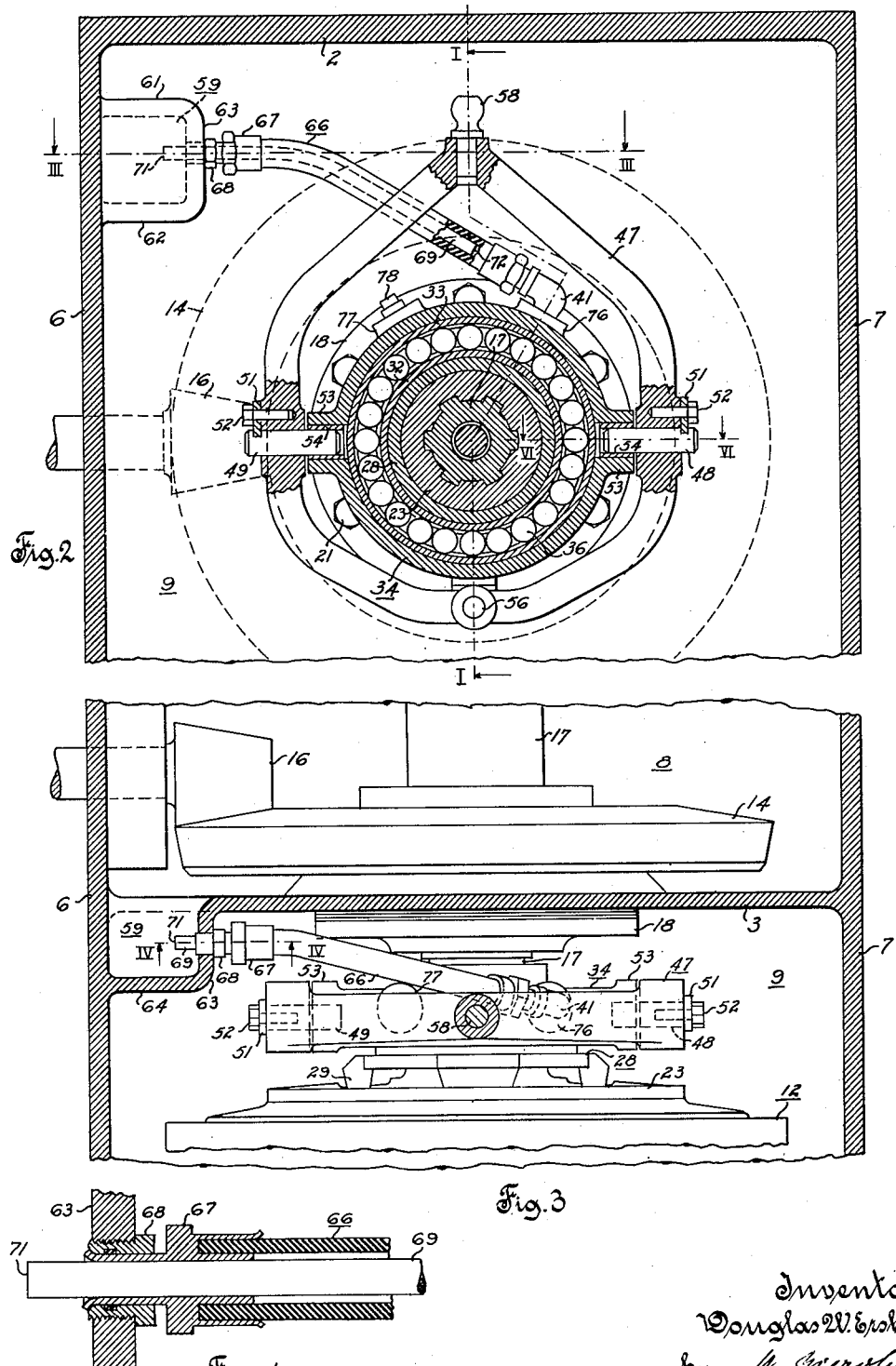

Patented Dec. 12, 1950

2,533,568

UNITED STATES PATENT OFFICE 2,533,568

CLUTCH BEARING LUBRICATION

Douglas W. Erskine, Springfield, Ill., assignor to Allis-Chalmers Manufacturing Company, Milwaukee, Wis., a corporation of Delaware Application November 26, 1947, Serial No. 788,173

11 Claims. (Cl. 184—11)

The invention relates to motor vehicles, and it is concerned more particularly with an automatically lubricated clutch actuating mechanism for such vehicles.

In conventionally constructed motor vehicles in which a friction clutch and an actuating mechanism therefor are enclosed within a housing, it has heretofore been a common practice to mount a grease fitting on the housing for connection with a grease gun or similar apparatus, and to mount a flexible conduit within the housing for delivery of grease from the fitting to the wearing surfaces of the clutch actuating mechanism, the conduit being permanently connected at one end to the fitting and at its other end to a part of the clutch actuating mechanism, which is movable back and forth in order to engage and disengage the clutch.

In vehicles such as crawler tractors, which are equipped with clutch and brake steering mechanisms, it has heretofore been usual to provide a pair of such flexible lubricant conduits as part of the steering clutch installation in order to take care of its lubrication requirements by means of a grease gun in the manner outlined hereinbefore. In such installations, after the grease gun has been operated to force semifluid grease through the conduits to the clutch actuating mechanisms, a certain amount of the grease which is ejected from the gun is left or stored in the conduits, and as long as such stored grease remains in its semifluid state it is not apt to pass to the wearing surfaces of the clutch actuating mechanisms. During subsequent operation of the vehicle, when the steering brakes and clutches are used to turn it, the incident generation of heat causes the lubricant which is stored in the conduits to become more liquid, and it will then flow from the conduits to the wearing surfaces of the clutch actuating mechanisms. However, the heat which is generated by the steering brakes and clutches during normal operation of the vehicle becomes frequently so intense as to completely liquify the grease which is stored in the conduits, and as a result, much more grease will flow out of the conduits than is required in order to maintain the actuating mechanisms of the steering clutches in properly lubricated condition. This is not only wasteful but also depletes the grease supply in the conduits at an unnecessarily rapid rate. The operator of the vehicle is usually not aware of this condition, and unless grease gun lubrication of the mechanism is repeated at relatively short time intervals, the wearing surfaces of the clutch actuating mechanisms are apt to run dry with consequent damaging results.

The oversupply of lubricant from the conduits to the clutch actuating mechanisms, which occurs, as explained hereinbefore, when the grease in the conduits becomes completely liquified, is further objectionable because the excess lubricant is apt to be thrown around in the casing which encloses the steering brakes and clutches, and some of such lubricant may be splashed upon the friction linings of these mechanisms. Considering that this may occur after each greasing operation, and that grease application by means of the grease gun must be repeated frequently, as pointed out hereinbefore, it is obvious that the mentioned splash of excess lubricant is apt to seriously impair the proper functioning of the steering brakes and clutches.

It has also been found that lubrication of the clutch actuating mechanisms by means of a grease gun has another disadvantage because most of these guns have metal barrels which one cannot see through in order to determine whether lubricant is being moved, and there are always some air pockets in the lubricant which result in no lubricant being moved when the gun is operated.

Generally, it is an object of the invention to provide an improved lubricant supply system for a clutch actuating mechanism, which will avoid the hereinabove mentioned shortcomings and disadvantages of the prior art, and which will take care of the lubrication requirements of the clutch actuating mechanism in a very simple and fully satisfactory manner.

More specifically, it is an object of the invention to incorporate, in a motor vehicle, an improved gravity feed lubricant supply system for a clutch actuating mechanism, which system will automatically function while the vehicle is running, to deliver a predetermined, accurately measured amount of lubricant to the clutch actuating mechanism, and which system will become automatically inoperative when the vehicle is stopped, the metered amount of lubricant being restricted substantially to the lubrication requirements of the clutch actuating mechanism.

A further object of the invention is to provide an automatic lubricant supply system of the above mentioned character, in which the accurately metered amount of lubricant is derived from a lubricant containing gear compartment of the motor vehicle.

A further object of the invention is to provide in a motor vehicle, such as a crawler tractor, which is equipped with a pair of steering clutches, a lubricant supply system of the above mentioned character which will automatically take care of the lubrication requirements of the actuating mechanisms of said steering clutches.

A further object of the invention is to provide an improved lubricant supply system which readily lends itself for use in connection with a conventional type of clutch actuating mechanism including an antifriction bearing, a pair of pivot bearings and a sliding bearing for a clutch throwout collar; and which system will automatically function to admit a predetermined amount of lubricant to said bearings, which is adequate to meet but does not materially exceed the lubrication requirements of said bearings.

These and other objects and advantages are attained by the present invention various novel features of which will be apparent from the description herein and the accompanying drawings disclosing an embodiment of the invention, and will be more particularly pointed out in the appended claims.

Referring to the drawings:

Fig. 1 is a rear view of a clutch steering mechanism for a crawler tractor, parts of the mechanism and part of a housing therefor being shown in vertical section on line I—I of Fig. 2;

Fig. 2 is a side view of the mechanism shown in Fig. 1, and showing parts thereof in vertical section on line II—II of Fig. 1;

Fig. 3 is a top view of part of the mechanism shown in Fig. 1, and showing parts thereof in horizontal section on line III—III of Fig. 2;

Fig. 4 is an enlarged detail view in section on line IV—IV of Fig. 3;

Fig. 5 is a detail view in vertical section on line V—V of Fig. 1; and

Fig. 6 is a detail view in horizontal section on line VI—VI of Fig. 2.

Referring to Fig. 1, a transmission housing comprises a bottom wall 1, a top wall 2, and a pair of vertical partitions 3 and 4 which merge with the top and bottom walls and with front and rear walls 6 and 7 (Fig. 2) of the housing to form a wet compartment 8 therein, and at the opposite sides of said wet compartment the housing has dry compartments 9 and 11, respectively. A pair of friction clutches, generally designated by the reference characters 12 and 13, are mounted in the dry compartments 9 and 11, respectively, and transmission gears, in the form of a bevel gear 14 and a bevel pinion 16 (Fig. 2) are mounted in the wet compartment 8. The bevel gear 14 is mounted on a shaft 17 which is rotatably supported in axially fixed position on the partitions 3 and 4 in conventional manner. A bearing retainer 18 mounting a roller bearing 19 for the shaft 17 is mounted in a hole of the partition 3. The retainer 18 is secured in fixed position on the partition 3 by a circumferential series of cap screws 21, and the gap between the shaft 17 and the bearing retainer 18 is sealed by an oil seal 22 of conventional construction. The mounting of the shaft 17 on the partition 4 corresponds to that just described in connection with the partition 3, corresponding parts being designated by identical reference characters.

The clutch 12 has a flanged driving hub 23 which is nonrotatably secured in axially fixed position on a portion of the shaft 17 which extends into the dry compartment 9, and the clutch 13 has a similar driving hub 24 which is nonrotatably secured to a portion of the shaft 17 which extends into the dry compartment 11. The clutches 12 and 13 are of the multiple disk type which is usually employed in clutch steering mechanisms for crawler tractors, and the driving hubs 23 and 24 are connected, respectively, with inner driving drums, not shown, of the clutches. Outer driven drums 26 and 27 of the clutches are connected in conventional manner with final drive mechanisms, not shown.

The mode of operation of the transmission gears 14 and 16 and of the clutches 12 and 13 is the same as in steering clutch installations of conventional construction, insofar as the transmission of power is concerned, and it is usual in such installations to also provide a pair of steering brakes within the dry compartments of the transmission housing. It will be understood that such steering brakes, while not shown in the drawings, comprise a pair of brake bands or the like, with friction linings which may be tightened upon the outer surfaces of the driven clutch drums 26 and 27.

Referring now to the actuating mechanism for the clutch 12, it will be noted that the flanged driving hub 23 of said clutch has a central, axially extending sleeve portion with an outer cylindrical surface on which a clutch throwout collar 28 is shiftably mounted for back and forth movement axially of the shaft 17. The throwout collar 28 has a circumferential series of axially extending thrust lugs 29 which project through apertures 31 of the flange portion of the driving hub 23, and the clutch 12 includes suitable internal mechanism, not shown, which is operable by the lugs 29 upon shifting movement of the clutch throwout collar 28 in the direction of arrow A to disengage the clutch 12. The internal mechanism of the clutch 12 includes suitable loading springs, not shown, which normally hold the clutch in engaged condition and which resiliently oppose movement of the clutch throwout collar 28 in the direction of arrow A.

An antifriction bearing of the actuating mechanism for the clutch 12 comprises an inner race 32 which is mounted on a central axially extending hub sleeve of the collar 28, and an outer race 33 which is mounted in an annular bearing cage 34, and a circumferential series of balls 36 which are operatively interposed between the inner and outer races 32 and 33 in radial and axial thrust transmitting relation thereto. Also operatively interposed between the inner and outer races 32 and 33 is a rotary oil seal 37 which seals the gap between said races at the side of the bearing next to the lugs 29 of the throwout collar.

The bearing cage 34 comprises a circumferential outer wall and a radially inwardly projecting annular flange portion 38 which has a circular inner edge surrounding a cylindrical, radially recessed end portion of the central hub sleeve of the throwout collar 28, the inner diameter of the flange 38 being a small fraction of an inch larger than the outside diameter of the radially recessed end portion of of the hub sleeve of the throwout collar, which is surrounded by the flange portion 38. The annular, axially extending outer wall of the bearing cage 34 has a threaded radial bore 39 (Fig. 5), and mounts a pipe elbow 41 which is screwed into the bore 39. The bore 39 communicates with a pocket 42 at the inner side of the bearing cage 34, and the pocket 42, in turn, communicates with the space between the inner and outer bearing races 32 and 33 at the side of the antifriction bearing adjacent to the radial flange 38. At the side of the flange 38 which faces the antifriction bearing, the cage 34 has a shoulder 43 (Fig. 5) which provides an axial abutment for the outer bearing race 33, and in the assembled condition of the parts as shown in Fig. 1, the inner bearing race 32 is spaced by an annular gap of relatively short axial width from the radial, inner surface of the flange 38 of the bearing cage 34. The shoulder 43 is interrupted by the pocket 42 and the latter, therefore, communicates with the mentioned gap or annular space between the axially inner side of the flange 38 and the inner race 32 of the antifriction bearing. An axially extending groove 44 and a radial bore 45 of the clutch throwout collar 28 connect the annular space between the inner race 32 and the flange 38 in lubricant communicating relation with an annular groove 46 at the inner cylindrical bearing surface of the clutch throwout collar 28, and which bearing surface cooperates with the cylindrical outer surface of the axially extending sleeve portion of the hub member 23 to support the throwout collar for back and forth movement relative to the driving hub of the clutch 12.

Referring to Fig. 2, a shift yoke 47 is pivotally connected with the bearing cage 34 at diametrically opposed points of the latter by means of a pair of pivot pins 48 and 49. The pivot pin 48 is nonrotatably and axially secured in a bore of the shift yoke 47 by means of a locking plate 51 and a cap screw 52, and projects into a boss 53 of the bearing cage 34. A portion of the pin 48 which projects inwardly from the shift yoke 47 is surrounded by a bearing bushing 54 which, in turn, is press-fitted into a bore of the boss 53. As shown more clearly in Fig. 6, the bushing 54 and the pin 48 terminate at a radial distance from the outer race 33, and the annular shoulder 43 within the bearing cage 34 is interrupted in proximity to the bore of the bearing hub 53. This arrangement places the mentioned annular space between the axially inner side of the radial flange 38 and the inner bearing race 32 into lubricant communicating relation with the relatively cooperating wearing surfaces of the pin 48 and the bushing 54.

The foregoing explanations with reference to the mounting of the pivot pin 48 similarly apply to the mounting of the pivot pin 49. That is, the relatively cooperating wearing surfaces of the pin 49 and its surrounding bearing bushing 54 likewise communicate in lubricant communicating relation with the mentioned annular space between the inner side of the flange 38 and the inner race 32 of the antifriction bearing of the actuating mechanism for the clutch 12.

As shown in Fig. 1, a thrust button 56 is mounted on a lower part of the shift yoke 47, and a complementary thrust button 57 opposite to the thrust button 56 is mounted on the lower part of the bearing retainer 18. At its upper part the shift yoke 47 has a ball head 58 for connection with a suitable mechanism (not shown) which is operable to rock the shift yoke 47, from the position shown, about the axis of the pivot pins 48 and 49 to the left in Fig. 1, and thereby shift the clutch throwout collar 28 in the direction of arrow A from the clutch engaged position in which the collar is shown, into clutch disengaged position.

The actuating mechanism for the clutch 13 in the dry compartment 11 is an opposite hand duplicate of the actuating mechanism for the clutch 12. The foregoing explanations with reference to the actuating mechanism for the clutch 12, therefore, analogously apply to the actuating mechanism for the clutch 13, corresponding parts of the two clutch actuating mechanisms being designated, in Fig. 1, by the same reference characters.

Features of the herein disclosed clutch actuating mechanism are claimed in a copending application Serial No. 739,279, filed April 4, 1947 by William F. Wilson for Clutch Installation for Motor Vehicles.

Referring to Figs. 1, 2 and 3, an upper part of the partition 3 has a cavity 59 which faces the interior of the wet compartment 8, and which is defined by a portion of the front wall 6 (Fig. 2), by horizontal top and bottom wall portions 61 and 62, by a vertical rear wall portion 63 and by a vertical side wall portion 64, the top and bottom wall portions 61 and 62 and the rear wall portion 63 extending transversely of the plane of the partitions 3 and into the dry compartment 9 of the transmission housing. A flexible lubricant conduit 66, in the form of a hose of rubber-like, oil resistant material, has an upper end which is connected in lubricant receiving relation with the cavity 59, and a lower end which is connected in lubricant delivering relation with the pipe elbow 41 on the bearing cage 34. As more clearly shown in Fig. 4, a nipple 67 is peripherally swaged upon the hose wall of the conduit 66 and is connected with the rear wall 63 of the cavity 59 by means of an adapter 68 which is screwed into a tapped hole of the wall 63 and which has a sealed swivel connection with the nipple 67. Inserted into the passage which is afforded by the nipple 67, and extending into the conduit 66 is a cylindrical, relatively long wick 69 of lubricant absorbent material, such as felt, and whose upper and lower end faces are designated by the reference characters 71 and 72, respectively. Preparatory to its insertion into the conduit 66 the wick 69 is soaked in oil, and the diameter of the wick and the bore of the nipple 67 are so proportioned that when the soaked wick is inserted into the bore of the nipple 67, the wick will be slightly compressed radially, and the resulting frictional resistance against axial displacement of the wick will be sufficient to retain the wick in axially adjusted position relative to the nipple 67. The axial length of the wick 69 is such as to suit existing requirements, as will be explained more fully hereinbelow, an upper portion of the wick extending beyond the nipple 67 and into the cavity 59. As shown in Figs. 2 and 4, the length of the wick portion in the cavity 59 is about equal to twice the diameter of the wick.

As shown in Fig. 1, another cavity 73 is formed at an upper part of the partition 4 in the same manner as has been explained hereinbefore in connection with the cavity 59 and the partition 3. Like the cavity 59, the cavity 73 faces the wet compartment 8, the top, bottom and rear walls of the cavity 73 extending transversely of the plane of the partition 4 into the dry compartment 11. A flexible lubricant conduit 74, which is an exact duplicate of the lubricant conduit 66, is connected at its upper end in lubricant receiving relation with the cavity 73, in the same manner as has been explained hereinbefore with reference to the conduit 66, and the lower end of the conduit 74 is connected in lubricant delivering relation with the bearing cage 34 of the actuating mechanism for the clutch 13. A wick 75, which is an exact duplicate of the wick 69, is inserted into the conduit 74, and arranged in the same manner as explained hereinbefore in connection with the wick 69.

Referring to Fig. 2, the bearing cage 34 of the actuating mechanism for the clutch 12 has two bosses 76 and 77 which are formed on the upper half of the bearing cage and are located symmetrically with reference to a vertical plane which extends at right angles to the axis of the pivot pins 48 and 49 through the center of the bearing cage 34. The boss 76 serves to connect the conduit 66 in lubricant delivering relation with the bearing cage 34 of the actuating mechanism for the clutch 12, and for that purpose it is provided with the tapped radial bore 39 (Fig. 5) which has been mentioned hereinbefore. The boss 77 has a similar, tapped radial bore which, as shown in Fig. 2, is closed by a threaded plug 78. From Fig. 1 it will be noted that the bearing cages 34 of the actuating mechanisms for the clutches 12 and 13, respectively, are relatively reversed, and in the actuating mechanism for the clutch 13 the flexible conduit 74 is connected with the boss 77, and the boss 76 is closed by a plug.

Generally, the actuating mechanisms for the clutches 12 and 13 comprise movable bearing means which are enclosed in the dry compartments 9 and 11 at opposite sides of the wet compartment 8, and the lubricant conduit means 66 and 74 are connected in lubricant receiving relation with said wet compartment, and in lubricant delivering relation, respectively, with said bearing means. Each of said movable bearing means comprises a bearing cage 34 which has two apertures for alternative connection, respectively, with said lubricant conduit means. The radial opening 39 of the bearing cage 34, at the left of the wet compartment 8, is formed in a portion of said bearing cage which extends peripherally between the pivot pins 48 and 49, and the radial opening of the bearing cage 34, at the right of the wet compartment 8, to which the conduit 74 is connected, is also formed in a peripheral portion of the latter bearing cage between the horizontal pivot bearings thereof.

The transmission gears 14 and 16 are immersed in lubricant which is stored in the wet compartment 8, and in preparing the mechanism for operation the wet compartment is filled with a relatively light lubricant, such as motor oil, up to a level approximately in line with the axis of the shaft 17. For operation at an atmospheric temperature above 32° Fahrenheit the recommended oil for the wet compartment is a motor oil having a rated viscosity of SAE 50, and for operation at an atmospheric temperature of 32° Fahrenheit or lower the oil should have a rated viscosity of SAE 30. As a result of rotation of the bevel pinion 16 and of the bevel gear 14, during propulsion of the tractor, lubricant will be splashed from the lower into the upper part of the wet compartment 8, and some of such splashed lubricant will be thrown into the cavities 59 and 73. Passage of lubricant from the cavities 59 and 73 into the conduits 66 and 74, respectively, is restricted and controlled by the wicks 69 and 75. The function of the wicks is to continuously admit a relatively small amount of lubricant, such as one cubic centimeter per hour, from each of the cavities 59 and 73 to the lower ends of the conduits 66 and 74, while the gears 14 and 16 are rotating. The part of the lubricant which enters the conduits 66 and 74 at their upper ends will flow by gravity through the pipe elbows 41 into the bearing cages 34, and from the latter the lubricant will pass to the wearing surfaces of the bearing races 32, 33, to the inner axial sleeve surfaces of the throwout collars 28 and to the wearing surfaces of the pivot pins 48 and 49 and their surrounding bushings 54, as will be readily apparent from the detailed description hereinbefore, of the construction of the clutch actuating mechanisms.

Referring to Fig. 2, the amount of wick projecting in the cavity 59, the amount of wick projecting into the conduit 66 and the density of the wick material are so coordinated as to restrict the flow of lubricant through said conduit substantially to the lubrication requirements of the antifriction bearing, pivot bearings and slide bearing of the actuating mechanism for the clutch 12 when the tractor is running. The lubrication requirements of the actuating mechanism for the clutch 13 are taken care of in the same manner. When the tractor is stopped, the small amount of oil in the conduits gradually drains past the inner edge of the flanges 38 of the bearing cages 34 and past the cooperating axial bearing surfaces of the throwout collars 29 and the central sleeve portions of the driving hubs 23 and 24, into the dry compartments 9 and 11. The bottom wall 1 of the transmission housing has two openings 79 and 80 in communication, respectively, with the dry compartments 9 and 11, and the small amounts of oil which may drip from the bearing cages 34 into the dry compartments 9 and 11 will thus be prevented from accumulating in said compartments.

Generally stated, the wicks 69 and 75 serve as flow check means which restrict flow of lubricant from the wet compartment 8 through the conduits 66 and 74 substantially to the lubrication requirements of the actuating mechanisms for the clutches 12 and 13.

As to the material of the wicks 69 and 75, felt has been mentioned hereinbefore, and in actual practice SAE F-12 felt has been found to possess suitable characteristics for the intended purposes. In an installation constructed as shown in the drawings, the desired results have been obtained by using wicks of the mentioned material, each 8¼ inches long, $\frac{5}{16}$ inch diameter, and ½ inch free wick length in each of the cavities 59 and 73.

It should be understood that it is not intended to limit the invention to the hereinabove specified data or to the hereinabove described forms and details, and that the invention includes such other forms and modifications as are embraced by the scope of the appended claims.

It is claimed and desired to secure by Letters Patent:

1. In a clutch installation for motor vehicles of the type in which a transmission housing comprises a wet compartment enclosing transmission gears operative to splash lubricant from a lower into an upper part of said wet compartment, and a dry compartment enclosing a friction clutch and horizontally movable bearing means of an actuating mechanism for said clutch, the combination of a flexible lubricant conduit having an upper end connected in lubricant receiving relation with said upper part of said wet compartment, and a lower end connected in lubricant delivering relation with said bearing means and in such relation to said upper end of said conduit that part of the lubricant which is splashed into said upper part of said wet compartment and which enters said flexible conduit at said upper end thereof may flow by gravity to said bearing means, and fluid flow check means associated with said flexible conduit, said fluid flow check means being operative to restrict the flow of lubricant through said conduit substantially to the lubrication requirements of said bearing means.

2. A clutch installation as set forth in claim 1, and in which said flow check means are formed by a lubricant absorbent wick inserted into said flexible conduit.

3. A clutch installation as set forth in claim 2, and in which a portion of said wick extends from the upper end of said flexible conduit into said wet compartment of said transmission housing.

4. In a clutch installation for motor vehicles of the type in which a transmission housing comprises a wet compartment enclosing transmission gears operative to splash lubricant from a lower into an upper part of said wet compartment, and a dry compartment enclosing a friction clutch, an axially shiftable clutch throwout collar and shift means for said collar comprising an annular bearing cage and an antifriction bearing operatively interposed between said collar and cage, the combination of a flexible lubricant conduit having an upper end connected in lubricant receiving relation with said upper part of said wet compartment, and a lower end connected with a radial opening of said bearing cage in lubricant admitting relation to the wearing surfaces of said antifriction bearing, and fluid flow check means restricting flow of lubricant through said flexible conduit substantially to the lubrication requirements of said antifriction bearing.

5. In a clutch installation for motor vehicles of the type in which a transmission housing comprises a wet compartment enclosing transmission gears operative to splash lubricant from a lower into an upper part of said wet compartment, and a dry compartment enclosing a friction clutch, an axially shiftable clutch throwout collar and shift means for said collar comprising an annular bearing cage, an antifriction bearing operatively interposed between said collar and cage, a shift yoke, and pivot means operatively connecting said shift yoke with said bearing cage, the combination of a flexible lubricant conduit having an upper end connected in lubricant receiving relation with said upper part of said wet compartment, and a lower end connected with a radial opening of said bearing cage in lubricant admitting relation to the wearing surfaces of said antifriction bearing and pivot means, and fluid flow check means restricting flow of lubricant through said flexible conduit substantially to the lubrication requirements of said antifriction bearing and pivot means.

6. In a clutch installation for motor vehicles of the type in which a transmission housing comprises a wet compartment enclosing transmission gears operative to splash lubricant from a lower into an upper part of said wet compartment, and a dry compartment enclosing a friction clutch, an axially shiftable clutch throwout collar having an axially extending sliding surface at its inner periphery, and shift means for said collar comprising an annular bearing cage, an antifriction bearing operatively interposed between said collar and cage, a shift yoke, and pivot means operatively connecting said shift yoke with said bearing cage, the combination of a flexible lubricant conduit having an upper end connected in lubricant receiving relation with said upper part of said wet compartment, and a lower end connected with a radial opening of said bearing cage in lubricant admitting relation to said sliding surface of said throwout collar and to the wearing surfaces of said antifriction bearing and pivot means, and fluid flow check means restricting flow of lubricant through said flexible conduit substantially to the lubrication requirements of said sliding surface, antifriction bearing and pivot means.

7. A clutch steering mechanism for motor vehicles comprising, in combination, a transmission housing having a pair of vertical partitions merging with front, rear and bottom walls of said housing to form a wet compartment therein, and having dry compartments at opposite sides, respectively, of said wet compartment, each of said partitions being recessed at an upper portion thereof to form cavities facing the interior of said wet compartment, transmission gears operable within said wet compartment to splash lubricant from a lower portion of said wet compartment into said cavities, clutch actuating mechanisms including horizontally movable bearing means mounted within said dry compartments, respectively, a pair of flexible lubricant conduits having upper ends connected, respectively, in lubricant receiving relation with said cavities, and lower ends, connected, respectively, in lubricant delivering relation with said bearing means, and lubricant absorbent wicks inserted, respectively, into said conduits.

8. A clutch steering mechanism as set forth in claim 7, in which portions of said wicks extend from said upper ends of said lubricant conduits into said cavities, respectively, of said partitions.

9. A clutch steering mechanism as set forth in claim 7, in which said cavities have vertical wall portions extending transversely of said partitions and into said dry compartments, respectively, and in which said upper ends of said lubricant conduits are connected with holes formed, respectively, in said vertical wall portions of said cavities.

10. A steering mechanism for motor vehicles comprising, in combination, a transmission housing having a wet compartment and a right and left dry compartments at opposite sides, respectively, of said wet compartment; transmission gears operable within said wet compartment to splash lubricant from a lower portion of said wet compartment into an upper portion of the latter; right and left releasable power transmitting friction devices mounted, respectively, in said dry compartments; right and left lubricant conduits having upper ends connected, respectively, in lubricant receiving relation with apertures of said wet compartment at said upper portion of the latter and having lower ends within said dry compartments, respectively; control means for said friction devices comprising a right pair of relatively movable control elements in load bearing relation with each other requiring lubrication and mounted within said right dry compartment on a level below said apertures, and a left pair of relatively movable control elements in load bearing relation with each other requiring lubrication and mounted within said left dry compartment on a level below said apertures, said lower end of said right conduit communicating in lubricant delivering relation with one of said right pair of control elements, and said lower end of said left conduit communicating in lubricant delivering relation with one of said left pair of control elements; and lubricant flow check means associated, respectively, with said conduits and operative to restrict flow of lubricant through said conduits to the lubrication requirements of said control elements.

11. A mechanism as set forth in claim 10, in which cavities are formed in said upper portion of said wet compartment and have passages, respectively, in communication with said lubricant conduits, and in which lubricant absorbent wicks, forming said flow check means are inserted into said passages and extend into said cavities, respectively.

DOUGLAS W. ERSKINE.

REFERENCES CITED

The following references are of record in the file of this patent:

UNITED STATES PATENTS

| Number | Name | Date |
|---|---|---|
| 1,334,547 | Melcher | Mar. 23, 1920 |
| 1,493,319 | Brodie | May 6, 1924 |
| 1,526,048 | Bristow | Feb. 10, 1925 |
| 1,820,748 | Loeffler | Aug. 25, 1931 |
| 1,878,379 | Church | Sept. 20, 1932 |
| 1,961,568 | Peterson | June 5, 1934 |
| 2,368,963 | Boden | Feb. 6, 1945 |